United States Patent
Korn et al.

(10) Patent No.: US 10,450,891 B2
(45) Date of Patent: Oct. 22, 2019

(54) LOCALIZED ENGINE PROTECTION FROM CORROSION AND CONTAMINATION

(71) Applicant: United Technologies Corporation, Farmington, CT (US)

(72) Inventors: Nathan D. Korn, Glastonbury, CT (US); Marc J. Muldoon, Marlborough, CT (US)

(73) Assignee: United Technologies Corporation, Farmington, CT (US)

( * ) Notice: Subject to any disclaimer, the term of this patent is extended or adjusted under 35 U.S.C. 154(b) by 578 days.

(21) Appl. No.: 15/227,603

(22) Filed: Aug. 3, 2016

(65) Prior Publication Data

US 2018/0038242 A1 Feb. 8, 2018

(51) Int. Cl.
*F02C 7/30* (2006.01)
*F01D 25/00* (2006.01)
*F01D 25/28* (2006.01)

(52) U.S. Cl.
CPC ......... *F01D 25/007* (2013.01); *F01D 25/285* (2013.01); *F02C 7/30* (2013.01); *F05D 2230/72* (2013.01); *F05D 2260/608* (2013.01)

(58) Field of Classification Search
CPC ........ F01D 25/007; F01D 25/285; F02C 7/30; F05D 2230/72; F05D 2260/608; F16H 57/02; F16H 57/031; F16H 57/032; F16H 57/0409; F16H 57/045; F16H 2057/016
See application file for complete search history.

(56) References Cited

U.S. PATENT DOCUMENTS

| | | | |
|---|---|---|---|
| 2,747,365 A * | 5/1956 | Rainbow | F02C 7/047 60/39.093 |
| 3,250,114 A | 5/1966 | Booth | |
| 3,401,791 A | 9/1968 | Stott | |
| H000213 H * | 2/1987 | Panlaqui | 42/96 |
| 5,082,173 A | 1/1992 | Poehlman | |
| 5,257,008 A | 10/1993 | Elamin | |
| 5,293,996 A | 3/1994 | Duncan | |
| 5,346,128 A | 9/1994 | Wacker | |
| 5,514,035 A * | 5/1996 | Denniston | B60H 1/00414 454/121 |
| 5,887,784 A | 3/1999 | Haas | |
| 5,934,368 A | 8/1999 | Tanaka | |
| 6,161,765 A | 12/2000 | Kay | |
| 7,195,177 B2 * | 3/2007 | Haws | G05D 22/02 236/44 A |

(Continued)

FOREIGN PATENT DOCUMENTS

| | | | | |
|---|---|---|---|---|
| EP | 1489478 A2 * | 12/2004 | | G05D 22/02 |
| WO | WO-9305867 A1 * | 4/1993 | | B01D 53/261 |

OTHER PUBLICATIONS

Wikipedia.org, "Desiccant", available from <https://en.wikipedia.org/wiki/Desiccant> on May 26, 2016.
EP search report for EP17184298.2 dated Dec. 12, 2017.

*Primary Examiner* — Adam D Rogers
(74) *Attorney, Agent, or Firm* — O'Shea Getz P.C.

(57) ABSTRACT

Aspects of the disclosure are directed to a cover configured to substantially conform to a profile of a first assembly of an engine in terms of the dimensions of the first assembly and hermetically seal the first assembly such that a second assembly of the engine that is external to the cover is accessible, a container containing a desiccant, and a screen coupled to the container.

16 Claims, 4 Drawing Sheets

(56) References Cited

U.S. PATENT DOCUMENTS

| | | | |
|---|---|---|---|
| 7,400,952 B2 | 7/2008 | Pervaiz | |
| 8,435,335 B2 | 5/2013 | Lam | |
| 8,777,154 B2 * | 7/2014 | Alexander | B64F 1/005 244/1 R |
| 9,091,214 B2 * | 7/2015 | Cloft | F02C 7/32 |
| 9,446,857 B2 * | 9/2016 | Sparks | B64F 1/005 |
| 2004/0255598 A1 | 12/2004 | Haws et al. | |
| 2008/0141803 A1 * | 6/2008 | Christensen | F16H 25/20 74/89.4 |
| 2011/0212677 A1 | 9/2011 | Dooley | |
| 2012/0111017 A1 * | 5/2012 | Fritts | F02C 3/26 60/772 |
| 2014/0041393 A1 * | 2/2014 | Desai | F02C 7/055 60/779 |
| 2015/0040718 A1 * | 2/2015 | Taylor | F16H 57/027 74/606 R |
| 2015/0198056 A1 * | 7/2015 | Amini | C08K 3/04 415/173.4 |
| 2016/0096138 A1 * | 4/2016 | Martin | B01D 53/261 95/114 |

* cited by examiner

LOCALIZED ENGINE PROTECTION FROM CORROSION AND CONTAMINATION

BACKGROUND

Gas turbine engines, such as those which power aircraft and industrial equipment, employ a compressor to compress air that is drawn into the engine and a turbine to capture energy associated with the combustion of a fuel-air mixture. Due to the harsh environmental characteristics (e.g., elevated temperatures) in which an engine sometimes operates, the engine may be subjected to maintenance activities to ensure that the engine's reliability and efficiency is maintained.

Engine maintenance often involves the removal of at least a portion of a module or assembly, leaving the hardware that remains attached to the engine structure exposed. If left exposed for extended periods of time, openings are typically covered by plastic sheeting to reduce the risk of debris contamination; however, this approach typically results in gaps in the spatial coverage of the sheeting unless special care is taken. The use of the sheeting may prohibit access to the engine, which can be self-defeating to the intended purpose of opening the engine for maintenance in the first place. A mechanic/technician may be inclined to avoid using the sheeting in the interest of time/expediency.

Additionally, the use of the sheeting does not mitigate against the risk of corrosion, which is a function of the relative humidity level of the surrounding environment. In an effort to mitigate the risk of corrosion, desiccant bags are sometimes placed in or near the engine to absorb moisture. However, if a desiccant bag breaks or has a hole in it, the desiccant can escape from the bag and contaminate the engine. Additionally, the desiccant is typically only effective for a period of time and must be replaced if the maintenance activity exceeds that period of time.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system comprising: a cover configured to substantially conform to a profile of a first assembly of an engine in terms of the dimensions of the first assembly and hermetically seal the first assembly such that a second assembly of the engine that is external to the cover is accessible, a container containing a desiccant, and a screen coupled to the container. In some embodiments, the first assembly includes a fan drive gear system. In some embodiments, the first assembly includes an accessory gearbox. In some embodiments, the first assembly is made of a steel alloy. In some embodiments, the system further comprises a handle coupled to the container. In some embodiments, the screen includes pores, and a pore size of the pores is larger than a first threshold to enable the desiccant to absorb moisture, and the pore size is less than a second threshold to prohibit any desiccant that escapes from the container from entering the engine. In some embodiments, the system further comprises at least one fitting coupled to at least one of the cover, the screen, or the container. In some embodiments, the at least one fitting is configured to interface with an input shaft or a low pressure compressor coupling nut. In some embodiments, the cover is configured to be selectively coupled to or decoupled from a flange of the engine. In some embodiments, the cover is configured to be selectively coupled to or decoupled from the flange using at least one of a screw, a bolt, or an interface that includes an interference fit. In some embodiments, the container is configured as a line replaceable unit. In some embodiments, the system further comprises a second container containing a second desiccant, where the second container is configured to be coupled to the screen. In some embodiments, the system further comprises a timer configured to provide an indication when the desiccant needs to be supplemented or replaced. In some embodiments, the timer is configured to provide the indication based on at least one of a specification associated with the desiccant or a material property associated with the first assembly. In some embodiments, the system further comprises a gage configured to provide an indication of a humidity of an environment bounded by the cover and the container in which the first assembly is located. In some embodiments, the timer is configured to receive and process the indication of the humidity as part of providing the indication when the desiccant needs to be supplemented or replaced.

Aspects of the disclosure are directed to a method for servicing an engine having at least a first assembly and a second assembly, the method comprising: installing a container containing desiccant, coupling the container to a screen, installing at least one gauge, installing a cover that hermetically seals the first assembly and provides access to the second assembly, monitoring at least one parameter based on an output of the at least one gauge, determining that the at least one parameter exceeds a threshold, and taking a remedial action based on determining that the at least one parameter exceeds the threshold. In some embodiments, the method further comprises installing a seal by coupling the seal to at least one of the cover or a fitting, and performing a service operation on the second assembly when the cover is installed on the first assembly. In some embodiments, the at least one parameter includes at least one of an elapsed time and a relative humidity level. In some embodiments, the remedial action includes at least one of: supplementing or replacing the desiccant in the container, installing a second container containing second desiccant, or increasing a cooling output from an air conditioning unit.

BRIEF DESCRIPTION OF THE DRAWINGS

The present disclosure is illustrated by way of example and not limited in the accompanying figures in which like reference numerals indicate similar elements. The drawings are not necessarily drawn to scale unless specifically indicated otherwise.

DETAILED DESCRIPTION

Figure 1:
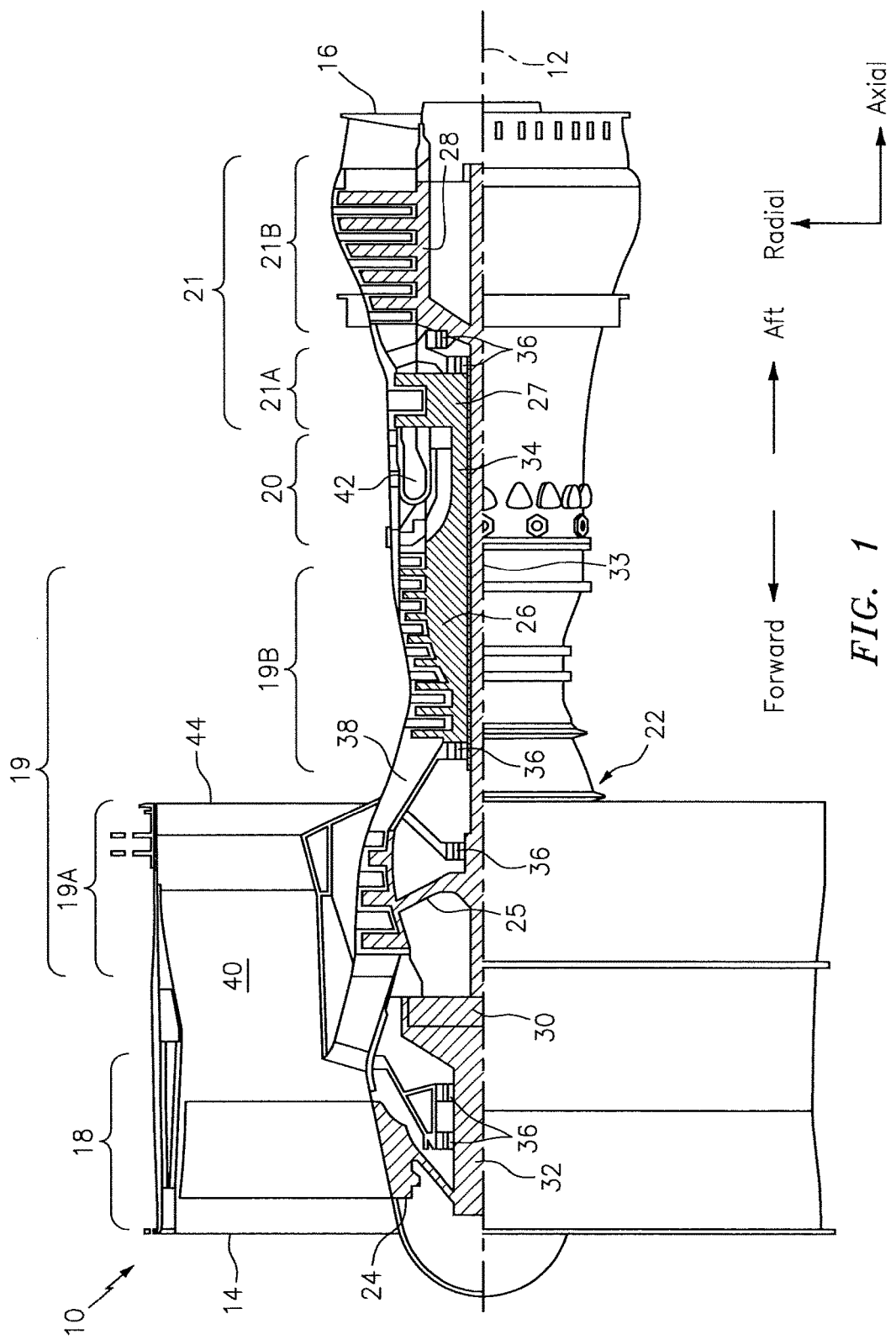
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with aspects of the disclosure, apparatuses, systems, and methods are directed to controlling/mitigating the risk of corrosion and contamination associated with an engine. In some embodiments, a containment system may be incorporated as part of the engine, potentially in association with one or more maintenance activities. The containment system may include one or more of a cover, a container/cartridge configured to hold/store a desiccant, a screen, one or more fittings, a timer, or a humidity gauge.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (BPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 2:
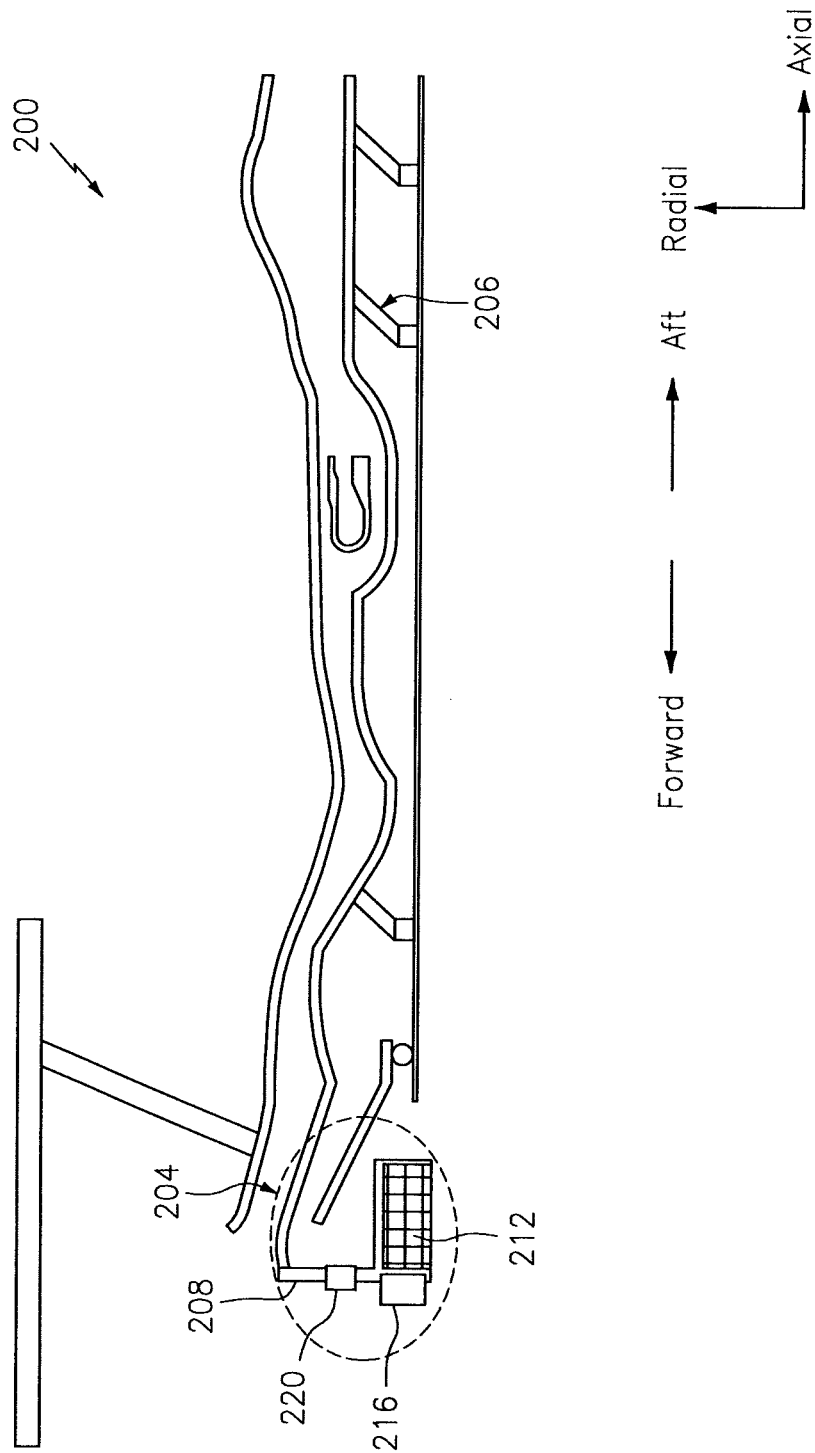
FIG. 2 illustrates a schematic line drawing of an engine with a containment system incorporated therewith.

Referring to FIG. 2, an engine 200 is shown. The engine 200 may correspond to the engine 10 of FIG. 1, with some of the details of FIG. 1 omitted for the sake of illustrative convenience and ease of description.

The system 200 may include a containment system, denoted in FIG. 2 by the broken lines/circle 204. The containment system 204 may be incorporated as part of, but less than the entirety of, the engine 200 in order to allow those portions that are outside of the scope/coverage of the containment system 204 to be subject to maintenance activities. Stated slightly differently, the use of the containment system 204 may enable continued access to other assemblies/components of the engine 200 that are outside of the circle 204, such as for example the assembly/component 206.

The containment system 204 may include a cover 208. The cover 208 (which may also be referred to as a desiccant cartridge or tool herein) may serve to isolate one or more components of the engine 204. The cover 208 may be made of one or more materials, such as for example plastic, aluminum, or steel. The material that is selected may ensure that installation of the cover 208 does not have an impact on the structural integrity of the engine hardware in the event that there is contact between the cover 208 and the engine hardware.

The cover 208 may be selectively coupled/decoupled to an interface of the engine 200, such as for example a flange of the engine 200. In some embodiments, the coupling/decoupling of the cover 208 may be facilitated by one or more bolts or screws, an interface that includes a snap/interference fit, etc.

The containment system 204 may include a container 212. The container 212 may be configured to hold a desiccant. The desiccant may assist in reducing the humidity of the local environment (e.g., the humidity of the any assemblies/components contained by/within the cover 208) by absorbing moisture of the local environment.

The containment system 204 may include a timer (gauge) 216. The timer 216 may provide an indication when the desiccant in the container 212 needs to be supplemented or replaced, which may be based on a specification/rating associated with the desiccant, a material property associated with an assembly/component that is to be protected, etc.

In terms of desiccant supplement or replacement, the container 212 may be removed from the containment system 204 temporarily to facilitate adding desiccant thereto and then the container 212 may reinstalled. Alternatively, and as described further below, if the container 212 (and desiccant contained therein) is treated as a line-replaceable-unit (LRU), a first instance of the container 212 (containing first desiccant) may be removed and a second instance of the container 212 (containing second desiccant different from the first desiccant) may be installed in place of the first instance of the container 212.

The containment system 204 may include a humidity gauge 220. The humidity gauge 220 may provide as output an indication of the (relative) humidity of the environment bounded by the containment system 204 (e.g., the cover 208). In some embodiments, the output of the humidity gauge 220 may be provided as an input to the timer 216. The timer 216 may be configured to process the output of the humidity gauge 220 and the timer 216 may base its output (e.g., its indication as to whether the desiccant or container 212, as applicable, needs to be replaced) on such processing. For example, if the humidity gauge 220 indicates a relative humidity value/level of 80% over a given time period, the timer 216 may indicate that the desiccant needs to be replaced sooner than if the relative humidity was 60% over that same time period.

While the timer 216 and the humidity gauge 220 are shown and referred to as separate devices in connection with FIG. 2, in some embodiments the timer 216 and the humidity gauge 220 may be integrated as a common device.

Figure 3:
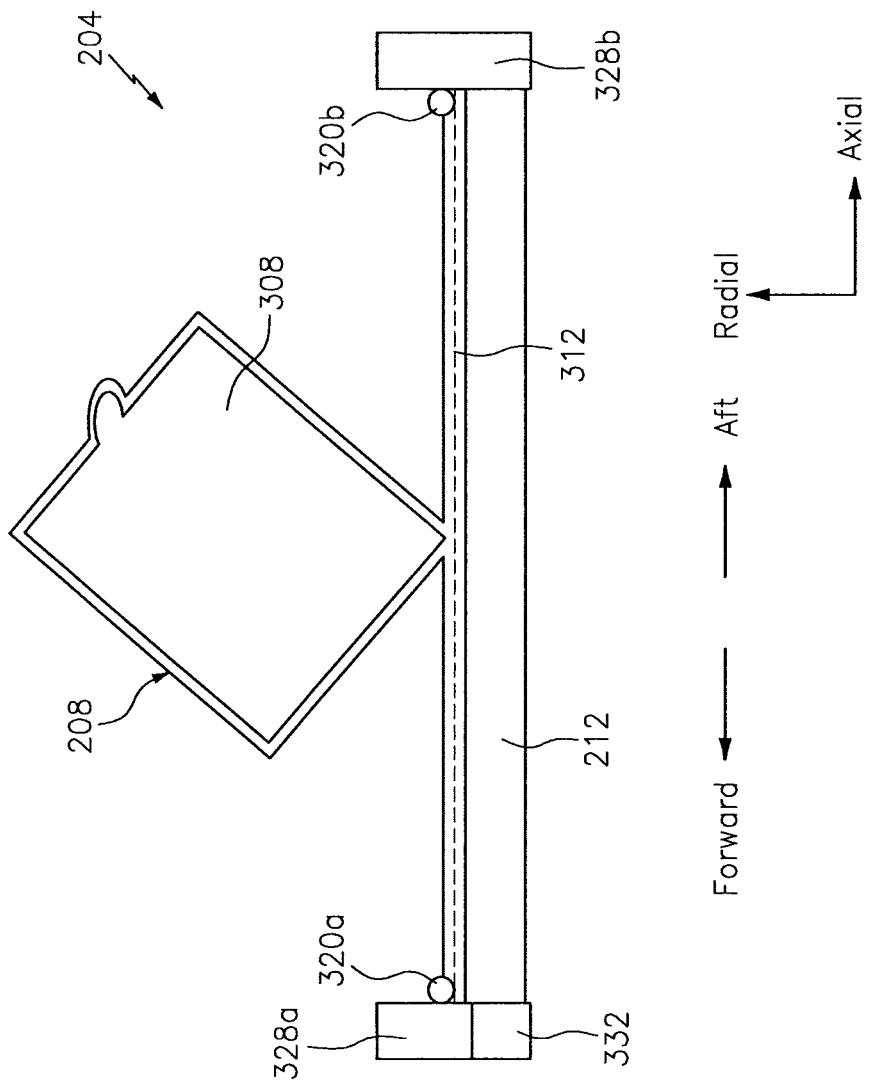
FIG. 3 illustrates aspects of a containment system of this disclosure.

Referring now to FIG. 3, additional aspects of the containment system 204 of FIG. 2 are shown. In particular, a screen 312 is shown as having been overlaid on top of the cartridge 212, where the screen 312 may be a separate entity from the cartridge 212 itself. The screen 312 may include one or more pores. The pores may be sized such that the pores may be larger than a first threshold to enable the desiccant contained within the container 212 to absorb moisture. The pore size may be less than a second threshold to prohibit any desiccant that may escape from the container 212 from entering the engine (e.g., an assembly 308).

The assembly 308 may be bound/contained by the cover 208. As conveyed by FIG. 3, the assembly 308 may have an odd/irregular shape. The cover 208 may be manufactured/fabricated to substantially conform to the contours/profile of the assembly 308 with respect to the dimensions of the assembly 308. In this respect, the cover 208 may be tailored/custom-fit to the assembly 308 and may form a hermetic seal around the perimeter of the assembly 308. To the extent that additional sealing capabilities are desired, one or more seals, such as for example seals 320a and 320b, may be included. The seals 320a and/or 320b may be conforming rubber seals and may be used to ensure that moisture will not enter an area of concern (e.g., will not have an appreciable impact on the assembly 308). The particular count or location of seals that are used may be based on the application at hand and may be based on the assembly 308 that is contained by the cover 208.

The assembly 308 may be indicative of any assembly/component of the engine that is prone/susceptible to corrosion or contamination. For example, the assembly 308 may include a fan drive gear system (FDGS) of the engine 200, an accessory gearbox of the engine 200, etc. In particular, materials of gears and journal pins of the FDGS may include a steel alloy (e.g., Pyrowear® Alloy 53 as provided by Carpenter Technology Corporation of Wyomissing, Pa.) that may benefit from aspects of this disclosure.

The cover 208 may be coupled to one or more fittings, such as for example a first fitting 328a and a second fitting 328b. To the extent that the assembly 308 includes an FDGS, at least one of the fittings 328a or 328b may be configured to interface with an input shaft of the FDGS or a low pressure compressor coupling nut.

In some embodiments, the cartridge 212 may include a handle 332. The handle 332 may facilitate ease in installation and/or removal of the cartridge 212, such as for example in embodiments where the cartridge 212 is treated as an LRU as described above.

Figure 4:
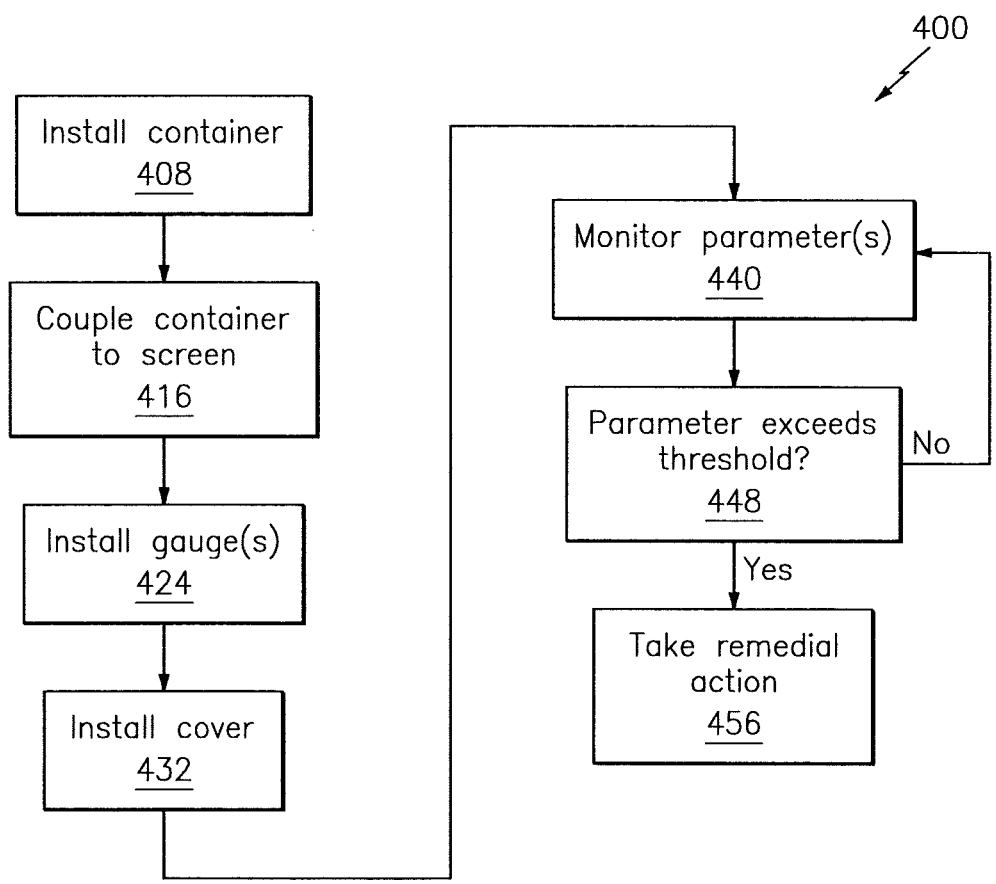
FIG. 4 illustrates a flow chart of a method for controlling an environment associated with an engine in accordance with aspects of this disclosure.

Referring to FIG. 4, a flow chart of an exemplary method 400 is shown. The method 400 is described below in relation to the engine 200 and containment system 204 described above for the sake of illustrative convenience. One skilled in the art would appreciate that the method 400 may be adapted to conform to other engines or containment systems.

In block 408, a container (e.g., container 212) may be installed. For example, the container may be installed as part of a containment system (e.g., containment system 204).

In block 416, the container may be coupled to a screen (e.g., screen 312). For example, the coupling of block 416 may be facilitated by a snap/interference fit, an engagement of/between one or more guide rails formed on the container or the screen, etc.

While shown as separate blocks in FIG. 4, the blocks 408 and 416 may be combined with one another in some embodiments (e.g., the installation of the container in block 408 may coincide with the coupling of the container to the screen in block 416).

In block 424, one or more gauges (e.g., timer 212, humidity gauge 220) may be installed.

In block 432, a cover (e.g., cover 208) may be installed. As part of block 432, the cover may be coupled to one or more interfaces of the engine, such as for example a flange of the engine, one or more fittings (e.g. fittings 328a/328b), etc. As part of block 432, one or more seals (e.g., seals 320a/320b) may be installed; the installation may include coupling the seals to the cover, a fitting, etc.

In block 440, one or more parameters associated with the containment system may be monitored. For example, the output of the gauges of block 424 may be monitored in block 440.

In block 448, a determination may be made whether a parameter monitored as part of block 440 exceeds a threshold. For example, as part of block 448 a determination may be made whether an elapsed time from when the containment system was placed in a sealed state/condition is greater than a threshold timeout. As part of block 448, a determination may be made whether a relative humidity level associated with the containment system is greater than a threshold.

If in block 448 it is determined that the monitored parameter doesn't exceed a threshold then flow may proceed from block 448 to block 440 to continue monitoring the parameter. On the other hand, if it is determined in block 448 that the parameter exceeds the threshold flow may proceed from block 448 to block 456.

In block 456, one or more remedial actions may be taken. For example, as part of block 448 desiccant contained within the container may be supplemented or replaced, or the container may be removed and replaced with a second container containing (second) desiccant. As part of block 456, output from one or more air conditioning units may be increased in an effort to combat elevated humidity levels.

Technical effects and benefits of this disclosure include a containment system that incorporates a cover that is configured to adhere to the shape/contour/profile of an assembly/component that is to be protected. The containment system may include a screened container that holds desiccant, where the desiccant reduces/eliminates the risk of corrosion with respect to the assembly/component. The use of the screen may reduce/eliminate the likelihood that desiccant that may escape the container may enter the assembly/component or any other portion of the engine. One or more timers or gauges may be used to monitor the humidity of the environment of the assembly/component and/or provide an indication when desiccant or an associated container needs to be replaced (at which point the desiccant or container, as applicable, may be replaced).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system comprising:
    a cover configured to conform to a profile of a first assembly of an engine in terms of dimensions of the first assembly and hermetically seal the first assembly such that a second assembly of the engine that is external to the cover is accessible;
    a container containing a desiccant;
    a screen coupled to the container; and
    a timer configured to provide an indication when the desiccant needs to be supplemented or replaced.

2. The system of claim 1, wherein the first assembly includes a fan drive gear system.

3. The system of claim 1, wherein the first assembly includes an accessory gearbox.

4. The system of claim 1, wherein the first assembly is made of a steel alloy.

5. The system of claim 1, further comprising:
    a handle coupled to the container.

6. The system of claim 1, wherein the screen includes pores, and wherein a pore size of the pores is larger than a first threshold to enable the desiccant to absorb moisture, and wherein the pore size is less than a second threshold to prohibit any desiccant that escapes from the container from entering the engine.

7. The system of claim 1, further comprising:
    at least one fitting coupled to at least one of the cover, the screen, or the container.

8. The system of claim 7, wherein the at least one fitting is configured to interface with an input shaft.

9. The system of claim 1, wherein the container is configured as a line replaceable unit.

10. The system of claim 1, wherein the timer is configured to provide the indication based on at least one of a specification associated with the desiccant or a material property associated with the first assembly.

11. The system of claim 10, further comprising:
    a gauge configured to provide an indication of a humidity of an environment bounded by the cover and the container in which the first assembly is located.

12. The system of claim 11, wherein the timer is configured to receive and process the indication of the humidity as part of providing the indication when the desiccant needs to be supplemented or replaced.

13. A method for servicing an engine having at least a first assembly and a second assembly, the method comprising:
    installing a container containing desiccant;
    coupling the container to a screen;
    installing at least one gauge;
    installing a cover that hermetically seals the first assembly and provides access to the second assembly;
    monitoring at least one parameter based on an output of the at least one gauge;
    determining that the at least one parameter exceeds a threshold; and
    taking a remedial action based on determining that the at least one parameter exceeds the threshold.

14. The method of claim 13, further comprising:
    installing a seal by coupling the seal to at least one of the cover or a fitting; and
    performing a service operation on the second assembly when the cover is installed on the first assembly.

15. The method of claim 13, wherein the at least one parameter includes at least one of an elapsed time and a relative humidity level.

16. The method of claim 13, wherein the remedial action includes at least one of
    supplementing or replacing the desiccant in the container.

* * * * *